United States Patent

Holtmanns et al.

(10) Patent No.: US 10,341,312 B2
(45) Date of Patent: Jul. 2, 2019

(54) CONTENT MANAGEMENT

(71) Applicant: Nokia Technologies Oy, Espoo (FI)

(72) Inventors: Silke Holtmanns, Klaukkala (FI); Jari Vainikka, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 163 days.

(21) Appl. No.: 15/124,434

(22) PCT Filed: Mar. 24, 2014

(86) PCT No.: PCT/FI2014/050213
§ 371 (c)(1),
(2) Date: Sep. 8, 2016

(87) PCT Pub. No.: WO2015/144969
PCT Pub. Date: Oct. 1, 2015

(65) Prior Publication Data
US 2017/0019384 A1    Jan. 19, 2017

(51) Int. Cl.
*H04L 29/06* (2006.01)
*H04L 9/32* (2006.01)
(Continued)

(52) U.S. Cl.
CPC .......... *H04L 63/0471* (2013.01); *G06F 21/10* (2013.01); *G06F 21/72* (2013.01);
(Continued)

(58) Field of Classification Search
None
See application file for complete search history.

(56) References Cited

U.S. PATENT DOCUMENTS

2003/0206636 A1    11/2003  Ducharme et al.
2005/0198379 A1*    9/2005  Panasyuk ................ G06F 21/31
                                                   709/239
(Continued)

FOREIGN PATENT DOCUMENTS

EP     1755285 A1    2/2007
EP     1895770 A1    3/2008
WO  2008/083391 A2   7/2008

OTHER PUBLICATIONS

International Search Report and Written Opinion received for corresponding Patent Cooperation Treaty Application No. PCT/FI2014/050213, dated Dec. 11, 2014, 13 pages.
(Continued)

*Primary Examiner* — Brandon S Hoffman
(74) *Attorney, Agent, or Firm* — Seppo Laine Oy

(57) ABSTRACT

According to an example embodiment of the present invention, there is provided an apparatus comprising at least one secure element configured to store at least two credentials, and at least one processing core configured to cause a first one of the at least two credentials to be employed to decrypt a first encrypted content to produce a first decrypted content, to cause a second one of the at least two credentials to be employed to decrypt a second encrypted content to produce a second decrypted content, and to cause the first decrypted content be provided to a first rendering device over a first secured tunnel connection, wherein an endpoint of the first secured tunnel connection resides in the apparatus.

16 Claims, 5 Drawing Sheets

(51) Int. Cl.

| | | |
|---|---|---|
| *H04N 21/00* | (2011.01) | |
| *H04N 21/2347* | (2011.01) | |
| *H04N 21/266* | (2011.01) | |
| *H04N 21/4405* | (2011.01) | |
| *G06F 21/10* | (2013.01) | |
| *H04N 21/254* | (2011.01) | |
| *H04N 21/4627* | (2011.01) | |
| *H04N 21/426* | (2011.01) | |
| *H04N 21/436* | (2011.01) | |
| *G06F 21/72* | (2013.01) | |

(52) U.S. Cl.
CPC .......... *H04L 9/3231* (2013.01); *H04L 9/3268* (2013.01); *H04L 29/06* (2013.01); *H04N 21/00* (2013.01); *H04N 21/2347* (2013.01); *H04N 21/2541* (2013.01); *H04N 21/26613* (2013.01); *H04N 21/42623* (2013.01); *H04N 21/43615* (2013.01); *H04N 21/4405* (2013.01); *H04N 21/4627* (2013.01); *H04L 2209/60* (2013.01)

(56) References Cited

U.S. PATENT DOCUMENTS

| | | |
|---|---|---|
| 2005/0209972 A1 | 9/2005 | Bjorkengren et al. |
| 2007/0254630 A1 | 11/2007 | Moloney et al. |
| 2008/0033881 A1 | 2/2008 | Ficco |
| 2011/0022641 A1 | 1/2011 | Werth et al. |
| 2011/0264906 A1 | 10/2011 | Pourzandi et al. |
| 2012/0005742 A1 | 1/2012 | Chen et al. |
| 2012/0173877 A1 | 7/2012 | Pendakur et al. |
| 2012/0204267 A1 | 8/2012 | Prafullchandra et al. |
| 2012/0216034 A1 | 8/2012 | Chen et al. |
| 2012/0216038 A1 | 8/2012 | Chen et al. |
| 2014/0039683 A1 | 2/2014 | Zimmermann et al. |

OTHER PUBLICATIONS

"Homes Need Intelligent Gateway to Become Really Smart", Videonet, Retrieved on Aug. 21, 2017, Webpage available at : http://v-net.tv/2013/10/08/homes-need-intelligent-gateway-to-become-really-smart/.

"Figaro : Home Gateways Will Strengthen Future Internet", TNO, Retrieved on Feb. 13, 2014, Webpage available at: https://www.tno.nl/nl/.

"Tivo Storage and Windows Home Server", Homeserver, Retrieved on Feb. 13, 2014, Webpage available at: https://homeservershow.com/tivo-storage-and-windows-home-server.html.

"Digital Home White Paper", Caba, IS 2003-31, 2003, 14 pages.

"Announce: Community Squeeze", Squeezebox, Retrieved on Aug. 10, 2017, Webpage available at: http://forums.slimdevices.com/showthread.php?98521-Announce-Community-Squeeze.

Extended European Search Report received for corresponding European Patent Application No. 14886712.0, dated Aug. 7, 2017, 6 pages.

* cited by examiner

CONTENT MANAGEMENT

RELATED APPLICATION

This application was originally filed as PCT Application No. PCT/FI2014/050213 filed Mar. 24, 2014.

FIELD OF INVENTION

The present invention relates to the field of managing content, such as for example content controlled by digital rights management, DRM, and/or encryption, software license management or in general protected data.

BACKGROUND OF INVENTION

Content, such as media content or applications, may be produced for consumption and enjoyment by consumers. For example, movies may be produced that consumers pay to see in cinemas, music is sold to consumers on compact disks, CDs, and digital versatile disks, DVDs, provide a format usable for renting movies to consumers from video rental stores. In the same way applications might be downloaded and enjoyed by the consumer e.g. games.

Content delivered in digital format over a communication network presents challenges to copyright owners, since media files in computer-readable format are easy to copy and reproduce. Unlicensed copying may reduce revenues from commercially produced content, whereby measured may be taken to reduce the ease of copying content in computer-readable format. On the other hand, consumers wish to use their legally obtained content not just on the device they used to obtain the content and do not wish to pay several times for it.

The content scrambling system, CSS, is a DRM solution that relies on encryption to prevent copying of content of DVD discs. In CSS, a DVD disk comprises an encrypted disk-specific key encoded on the disk, which a DVD player can decrypt using a special CSS key. The contents of the DVD disk can then be decrypted using the decrypted disk-specific key.

Region-coding is another approach to DRM. Under region coding, media carriers of content are encoded with a code specific to a region, such as for example Europe. Content players, such as for example DVD players, are likewise region-coded, with the region coding corresponding to the region where the content players are sold. Therefore, a content player purchased in Europe may be configured to play content encoded on media carriers that have the same encoding. As a consequence, a content player purchased in Europe may agree to play content from media carriers likewise purchased in Europe. This reduces illicit trade in media carriers, since media carriers from China, for example, could not be used in Europe. In some instances, a content player allows modifying the region coding a limited number of times to allow for moving between regions.

In cable or satellite television, a media stream delivered to households may be encrypted to prevent viewing without payment. In order to enable paying customers to view the stream, the customer may be provided with a smart card, for example, which comprises decryption keys needed to view the stream. In detail, the smart card may be installed in a cable or satellite receiver to enable decryption of the encrypted media stream.

Much like DRM, controlling access to otherwise sensitive information involves questions relating to encryption and usability. Information may be sensitive due to privacy, legal, commercial, political or military reasons, for example.

Some content management systems allow consumers to register a fixed amount of devices which are allowed to consume the content. The identity of those consumption devices is usually checked when they access the content.

SUMMARY OF THE INVENTION

According to a first aspect of the present invention, there is provided an apparatus comprising at least one secure element configured to store at least two credentials, and at least one processing core configured to cause a first one of the least two credentials to be employed to decrypt a first encrypted content to produce a first decrypted content, and to cause a second one of the at least two credentials to be employed to decrypt a second encrypted content to produce a second decrypted content, and to cause the first decrypted content be provided to a first rendering device over a first secured tunnel connection, wherein an endpoint of the first secured tunnel connection resides in the apparatus.

Various embodiments of the first aspect may comprise at least one feature from the following bulleted list:

- the at least one processing core is configured to cause the first one of the at least two credentials to be employed to decrypt the first encrypted content by providing the first encrypted content to at least one of the at least one secure element, and the at least one secure element is configured to output the first decrypted content
- the at least one secure element is configured to at least one of decode and error control the first decrypted content
- the apparatus further comprises a memory storing computer program code, the computer program code being configured to cause processing of at least one of the first encrypted content, the second encrypted content, the first decrypted content and the second decrypted content
- the computer program code is partially but not completely stored in the at least one secure element
- at least one of the at least one processing core and the at least one secure element is configured to provide the first decrypted content to at most a predetermined number of rendering devices
- the predetermined number is one
- the apparatus is configured to provide the second decrypted content to a second rendering device over a second secured tunnel connection, wherein an endpoint of the second secured tunnel connection resides in the apparatus.
- at least one of the endpoint of the first secured tunnel connection and the endpoint of the second secured tunnel connection resides in one of the at least one secure element
- the endpoint of the secured tunnel connection resides in one of the at least one secure element
- the secure element comprises a secure integrated component.

According to a second aspect of the present invention, there is provided a method comprising storing at least two credentials in at least one secure element comprised in an apparatus, and causing a first one of the least two credentials to be employed to decrypt a first encrypted content to produce a first decrypted content, causing a second one of the at least two credentials to be employed to decrypt a second encrypted content to produce a second decrypted content, and causing the first decrypted content be provided to a first rendering device over a first secured tunnel connection, wherein an endpoint of the first secured tunnel connection resides in the apparatus Various embodiments of the second aspect may comprise at least one feature corresponding to a feature from the preceding bulleted list laid out in connection with the first aspect.

According to a third aspect of the present invention, there is provided an apparatus, comprising at least one processing core configured to cause the apparatus to participate in a secured tunnel connection with a second apparatus, and to receive decrypted content over the secured tunnel connection, from the second apparatus, and at least one media rendering device configured to render the decrypted content.

Various embodiments of the third aspect may comprise at least one feature from the following bulleted list:

- an endpoint of the secured tunnel connection resides in a secure element comprised in the second apparatus
- the media rendering device comprises at least one of the following: a display screen and a speaker
- the apparatus is configured to provide a public key in connection with initialization of the secured tunnel connection, and to store a private key associated with the public key.

According to a fourth aspect of the present invention, there is provided a method, comprising causing an apparatus to participate in a secured tunnel connection with a second apparatus, and receiving decrypted content over the secured tunnel connection, from the second apparatus, and rendering the decrypted content.

Various embodiments of the fourth aspect may comprise at least one feature corresponding to a feature from the preceding bulleted list laid out in connection with the third aspect.

According to a fifth aspect of the present invention, there is provided an apparatus comprising means for storing at least two credentials in at least one secure element comprised in the apparatus, and means for causing a first one of the least two credentials to be employed to decrypt a first encrypted content to produce a first decrypted content, for causing a second one of the least two credentials to be employed to decrypt a second encrypted content to produce a second decrypted content, and for causing the first decrypted content be provided to a first rendering device over a first secured tunnel connection, wherein an endpoint of the first secured tunnel connection resides in the apparatus.

According to a sixth aspect of the present invention, there is provided an apparatus comprising means for causing an apparatus to participate in a secured tunnel connection with a second apparatus, and receiving decrypted content over the secured tunnel connection, from the second apparatus, and means for rendering the decrypted content.

According to a seventh aspect of the present invention, there is provided a non-transitory computer readable medium having stored thereon a set of computer readable instructions that, when executed by at least one processor, cause an apparatus to at least store at least two credentials in at least one secure element comprised in an apparatus, and cause a first one of the least two credentials to be employed to decrypt a first encrypted content to produce a first decrypted content, cause a second one of the least two credentials to be employed to decrypt a second encrypted content to produce a second decrypted content, and cause the first decrypted content be provided to a first rendering device over a first secured tunnel connection, wherein an endpoint of the first secured tunnel connection resides in the apparatus.

According to an eighth aspect of the present invention, there is provided a non-transitory computer readable medium having stored thereon a set of computer readable instructions that, when executed by at least one processor, cause an apparatus to at least cause an apparatus to participate in a secured tunnel connection with a second apparatus, and receive decrypted content over the secured tunnel connection, from the second apparatus, and render the decrypted content to be finalized once claims are final Industrial Applicability At least some embodiments of the present invention find industrial application in controlling access to sensitive or protected information to prevent unauthorized access and provide user-friendly authorized access, which also works offline.

DETAILED DESCRIPTION OF EXAMPLE EMBODIMENTS

A home device, such as for example a home gateway or router, may be configured to store a plurality of credentials, which may correspond to digital representations of smart cards, to enable interworking in a secure manner with a plurality of different protected content providers and for providing said content to at least one rendering device, also known as consuming device.

Figure 1:
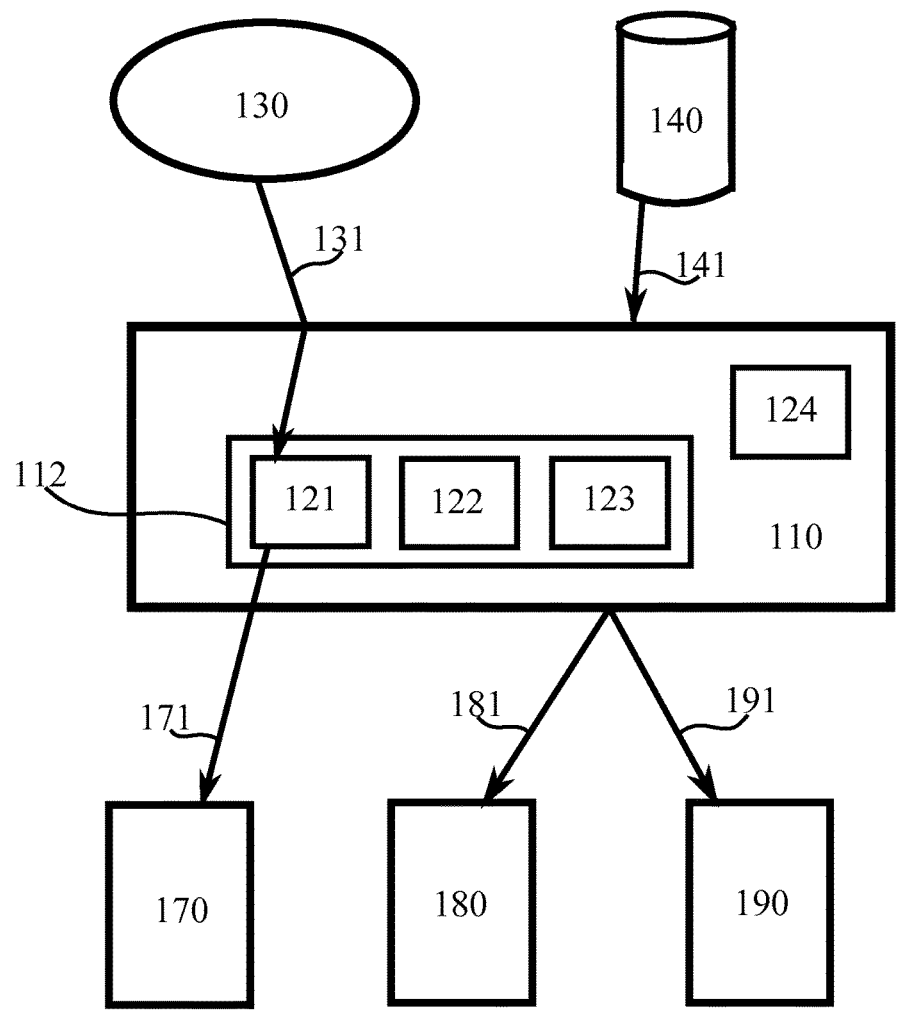
FIG. 1 illustrates an example system capable of supporting at least some embodiments of the present invention.

FIG. 1 illustrates an example system capable of supporting at least some embodiments of the present invention. Illustrated is an apparatus 110, which may comprise a gateway or router, a content consumption device, or other electronic device enabled to handle content, such as video, applications, or games or audio or audio-visual content, or other digital content. Apparatus 110 may comprise a configurable TV receiver. In this document, apparatus 110 will be referred to as gateway 110 as a terminological convention only without any limitation of scope.

Gateway 110 comprises at least one secure element 112, which may comprise, for example, a secured execution environment. Secure element 112 may comprise, for example, secure integrated component such as, for example, a smart card, a trusted element, a universal integrated circuit card, UICC, or another kind of secured integrated component. In general, a secure element may comprise a component or components that are engineered to make it difficult for unauthorized entities to access information stored in therein. The secure element might be realized in software and/or hardware, such as for example by a trusted execution environment, TEE, a system on chip, SoC, and/or a trusted platform module, TPM.

Stored in secure element 112 are credentials 121, 122 and 123. The number of credentials in the illustrated example is three, but the invention is not limited to that number, rather the number may be three, lower than three or higher than three depending on the environment and use. Each of credentials 121, 122 and 123 may comprise at least a cryptographic key that enables decryption of content. In some embodiments, at least one of credentials 121, 122 and 123 comprises a public key—private key combination in accordance with public-key cryptography.

Gateway 110 may comprise also credential 124, stored in a memory comprised in gateway 110, the generally accessible memory however not being comprised in secure element 112. Credential 124 may be usable for media content generated by an owner of gateway 110, or media content not protected by copyright, or for media content that is copyrighted but the copyright owned doesn't require secure credential storage.

Credentials may be registered with a content provider, and/or authorized by a content provider. Each credential comprised in gateway 110 may be associated with a content provider, with gateway 110 or a user of gateway 110. In effect, a credential may act as a reliable endpoint for the content provider. Each content provider only has access to the credentials related to his content.

Functionally connectable to gateway are disposed rendering devices 170, 180 and 190. Each of rendering devices 170, 180 and 190 may comprise, for example, a television, a speaker, a computer, a play-device, a tablet, a car, a navigation unit and/or a simple screen. The rendering devices need not be of the same type. The number of rendering devices may be lower of higher than what is illustrated in FIG. 1. In some embodiments, the number of rendering devices is one, that is, there is a single rendering device.

At the top of FIG. 1 are illustrated network 130 and database 140. Network 130 may comprise, for example, the Internet, a proprietary network or a service disposed in the Internet or a proprietary entertainment network. Database 140 may comprise a local storage, a cloud storage, a shared storage or a remote storage, for example. For example, database 140 may comprise a hard drive configured to store media content, a storage repository of a bank, housing association, corporation or library, for example. Gateway 110 may additionally or alternatively comprise storage capability, such as for example a built-in hard drive for local storage of content.

Arrow 141 illustrates an encrypted media stream from database 140 to gateway 110. Media content stored in database 140 may be stored therein in encrypted form to prevent copying of the media content. This illustrates a case where the content is of media type and streamed, but also batch deliveries of applications can be handled with the same approach. Playback, or in general consumption, of such content may be accomplished via gateway 110 in case gateway 110 is furnished with an associated credential, such as for example credential 124. Gateway 110 may decrypt the encrypted media stream using credential 124 and provide it to rendering devices 180 and 190, which may comprise a television and speakers, for example. Provision of content to rendering device 180 is illustrated by arrow 181, and provision of content to rendering device 190 is illustrated by arrow 191. In case the media content was generated by a consumer owning gateway 110, for example, credential 124 may be generated by the consumer to ensure that other users of database 140 cannot access his media content. In other words, the media content may be encrypted at rest in database 140. A consumer will have broad rights to his own content, wherefore he may be competent to decide credential 124 need not be stored in a secure element. Credential 124 may be a symmetric encryption key, or a pair of public-key encryption keys comprising a public key and a private key, for example.

Storing content locally in gateway 110 may make sense in case download pricing is high, or varies according to a time of day. For example, a content item may be configured to be downloaded during the night for viewing at a later time, during daytime, in case downloading during night time is cheaper or otherwise preferable. Storing content locally in gateway 110 may be, at least in some embodiments, disallowed by an owner of the content. The user may also be subscribed to a channel to receive content when it becomes available, which allows the content provider to scale the load on his servers. This of course also applies to applications and updates of applications e.g. security update channels.

Arrow 131 illustrates an encrypted media stream from network 130 to gateway 110. Media content from network 130 may be streamed therefrom in encrypted form to prevent unauthorized access to the media content. Network 130 may comprise, for example, a commercial video-on-demand service offering streaming of movies to consumers. To prevent piracy of the content, encryption may be used during transit from the service to gateway 110, as network 130 itself may be insecure and broadly accessible.

In the illustrated system, arrow 131 is directed inside gateway 110 to secure element 112. Secure element 112 may be furnished with independent data processing capability, to enable decryption of the media content to occur inside secure element 112, rather than inside gateway 110 but externally to secure element 112. This makes pirating the content more difficult, since decrypted content is less readily available in gateway 110. The decrypted content may be provided from secure element 112 to rendering and/or consuming device 170, which is illustrated in FIG. 1 by arrow 171. In some embodiments, for example due to lack of computation resources, the secure element may only manage the short term security keys for stream decryption and the decryption task itself is done by the application processor, for example in a special secure mode.

Connection 171 may comprise a secure connection, to make copying and/or interception of the decrypted content more difficult. For example, connection 171 may have its endpoints in rendering device 170 and secure element 112. This kind of connection may be initialized, for example, by registering rendering device 170 with gateway 110 prior to playback of the content, and/or by performing a cryptographic exchange between secure element 112 and rendering device 170 to establish a shared secret, which may be used to derive a key or keys for encryption between secure element 112 and rendering device 170. In other words, secure element 112 may be configured to decrypt content arriving from network 130 using credential 121 and to re-encrypt the decrypted content using a secret shared with rendering device 170 for delivery to rendering device 170.

An example of a cryptographic exchange is a diffie-hellman exchange or RSA based key exchange, which enables establishing over an untrusted connection a shared secret between two devices, such that the shared secret, or information enabling the shared secret to be derived by an eavesdropper, is not communicated over the untrusted connection. Another example of a cryptographic exchange is provided by public-key cryptography where public keys may be exchanged over an untrusted connection. In the illustrated example, rendering device 170 may provide its public key to secure element 112, which secure element 112 can then use when re-encrypting the content originating in network 130.

In case public key cryptography is used in a cryptographic exchange, it may be used to establish a shared key for use in symmetric cryptography, which may be computationally more efficient to use in streaming applications or for content that comes in frequently.

In some embodiments, manufacturers of rendering devices such as rendering devices 170, 180 and/or 190 may sign public keys of rendering devices they produce, and provide to manufacturers of gateways 110 or secure elements 112 certificates that enable verification of such signatures on public keys received in gateway 110 or secure element 112 from rendering devices. In these embodiments, each rendering device may store a private key matching the signed public key, to enable decryption of the content for rendering or consumption on the rendering device. In these embodiments, gateway 110 or secure element 112 may check, whether a public key it receives from a rendering device in connection with a cryptographic exchange is validly signed by a known manufacturer of rendering devices. In case it is not, provision of media content may be denied. This would make unauthorized copying the content difficult, since it is not available in decrypted format without support of the secure element 112, except inside the rendering device after the rendering device has decrypted it. A malicious consumer trying to access the decrypted media content could not prompt secure element 112 to provide it simply by generating a new pair of public and private keys, since he could not sign the public key in a way that secure element 112 would accept.

In case hardware or software of gateway 110 is updated, credentials 121, 122, 123 and/or 124 may need to be re-authorized toward at least one content provider, since the gateway may be the root of the trusted home environment. For example, a content provider may define criteria for re-authorization that gateway 110 checks in connection with updating, to determine if at least one credential needs to be re-authorized. A content provider may desire to associate credentials with a specific gateway configuration to control the risk of copied credentials being used in gateways other than the gateway of an authorized customer. Updates may be associated with specific scores, for example an update to a codec algorithm may be associated with a low score, while a change of motherboard of gateway 110 may be associated with a high score. In case the score of updating, for example a sum of scored associated with all updates since a previous authorization, exceeds a predetermined threshold, re-authorizing may need to be done. Re-authorizing may comprise re-authorizing a same credential, or issuance of a new or newly signed credential to replace a previous credential.

Secure element 112 or gateway 110 may be configured to at least one of decode and error control the first decrypted content. Decoding may comprise removing a coding, such as interleaving, and error controlling may comprise performing error-control coding, such as error detection and/or detection coding.

Figure 2:
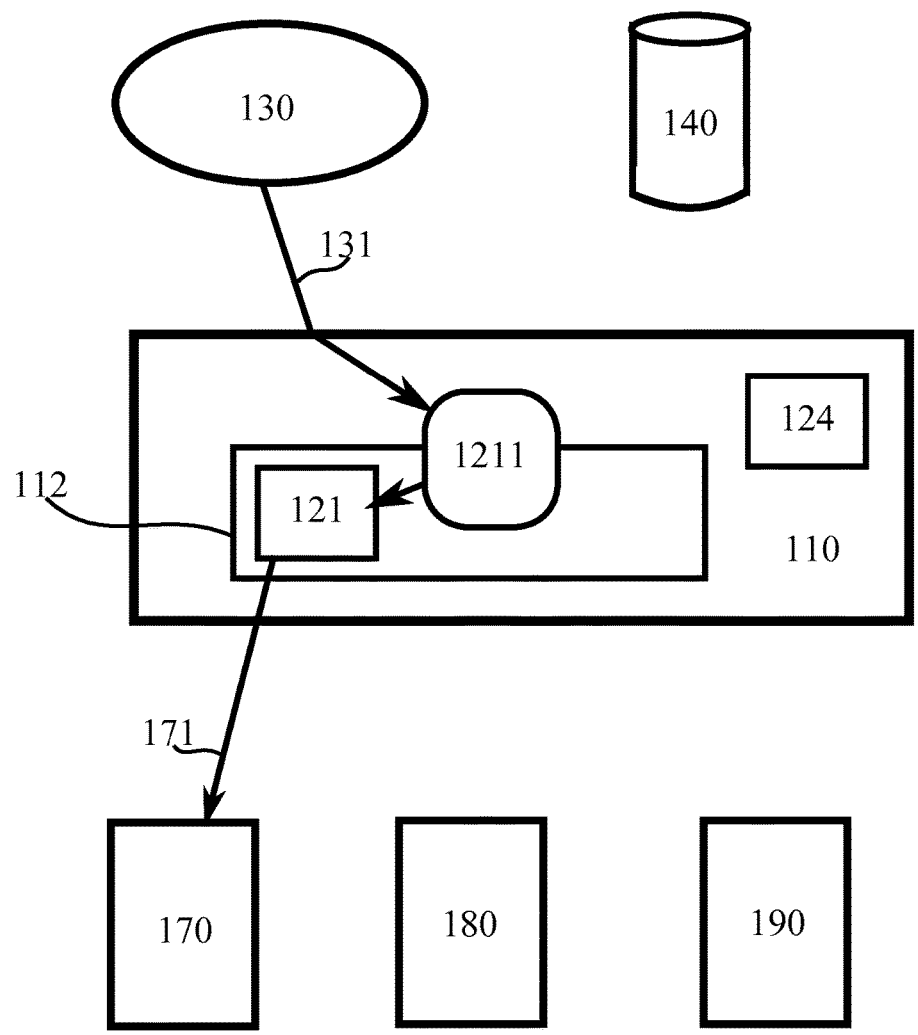
FIG. 2 illustrates an example system capable of supporting at least some embodiments of the present invention.

FIG. 2 illustrates an example system capable of supporting at least some embodiments of the present invention. The system of FIG. 2 resembles that of FIG. 1. In FIG. 2, we concentrate on provision of content from network 130, rather than database 140, wherefore flows from database 140 present in FIG. 1 are absent in FIG. 2.

Functionality 1211, which may comprise computer code, hardware logic or a combination of the two, resides partially in secure element 112 and partially in gateway 110 but external to secure element 112. Alternatively, functionality 1211 may, in different embodiments, reside entirely in secure element 112 or entirely in gateway 110 external to secure element 112.

Functionality 1211 may comprise functions needed in preparing media stream 131 for rendering. For example, functionality 1211 may detect which encryption algorithm is in use, detect which credential must be used for decrypting a particular stream or content flow, and/or functionality 1211 may facilitate charging for viewing media content or downloading applications. In that aspect, functionality 1211 may be arranged to communicate with a back-end to associate receiving content with a user account of a consumer who owns gateway 110 and/or accounts associated with gateway 110. Gateway 110 may comprise more than one functionality such as functionality 1211, for example, gateway 110 may comprise one functionality for each credential stored in gateway 110. Functionality 1211 may comprise a functionality specific to an operating system and/or ecosystem.

Functionalities such as functionality 1211 may be dynamically updatable via a network connection. In such updating, credentials such as credential 121 may be used to establish a secure connection with a remote server providing the updating functionality.

In FIG. 2, functionality 1211 receives encrypted media stream 131 and forwards it to credential 121 in secure element 112. Functionality 1211 may be related to an operating system ecosystem, with gateway 110 storing functionality 1211 to enable interworking of gateway 110 with the operating system ecosystem. This intermediate function may enable a rendering device to use content, even if it is coming from another ecosystem.

A variant of systems illustrated in FIG. 1 and FIG. 2 is a case where a rendering device comprises a credential. The credential may be authorized by, or registered with, a provider of content. In that regard, a rendering device may be considered to be an apparatus comprising a secure element 112 which in turn comprises the credential. In such a case, an encrypted media stream may be directed to the rendering device for decryption in the rendering device, which rendering device may be enabled to render the decrypted content without providing it to any further nodes. In such variants, a source of an encrypted media stream may be enabled to control the rendering device, for example by blocking certain features of the rendering device, such as for example copying, storage or fast-forward. Also in such variants, a rendering device may provide a public key of the rendering device, which may be signed by a manufacturer of the rendering device, to the source of the encrypted media stream. The public key may be used to establish a shared secret between the rendering device and the source, for establishing symmetric encryption therein between. Alternatively, another kind of cryptographic exchange may be employed between the rendering device and the source of the encrypted media stream.

Figure 3:
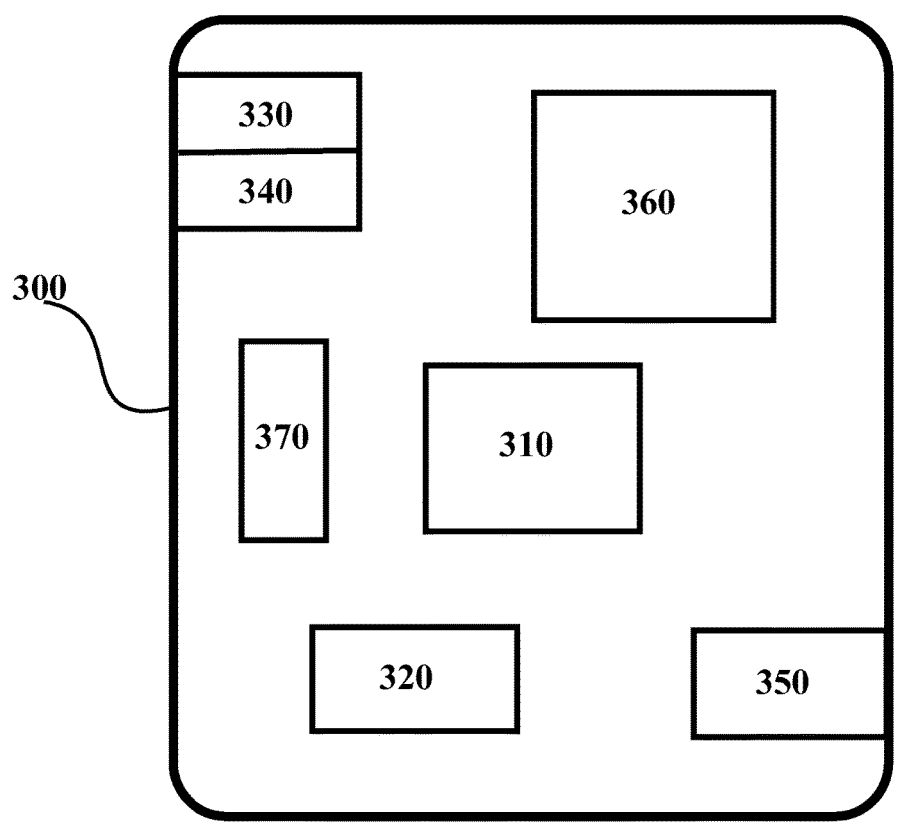
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a device such as gateway 110 or rendering device 170 of FIG. 1 or FIG. 2. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor or TrustZone chip, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with, wireless local area network, Bluetooth, Bluetooth Low Energy, WLAN, Ethernet, HDMI and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Bluetooth LE, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via User Interface 360, for example to request content to be delivered, to manage digital files stored in memory 320 or on a cloud accessible via transmitter 330 and receiver 340, or via NFC transceiver 350, and/or to play games, for example.

Device 300 may comprise or be arranged to accept a secure element 370, such as for example a secure integrated component. Secure element 370 may comprise information identifying a subscription of a user of device 300. A secure element 370 may comprise cryptographic information usable to verify the identity of a user of device 300 and/or to facilitate encryption of communicated information and billing of the user of device 300 for communication effected via device 300. A secure element 370 may be configured to store at least one credential, as discussed above.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
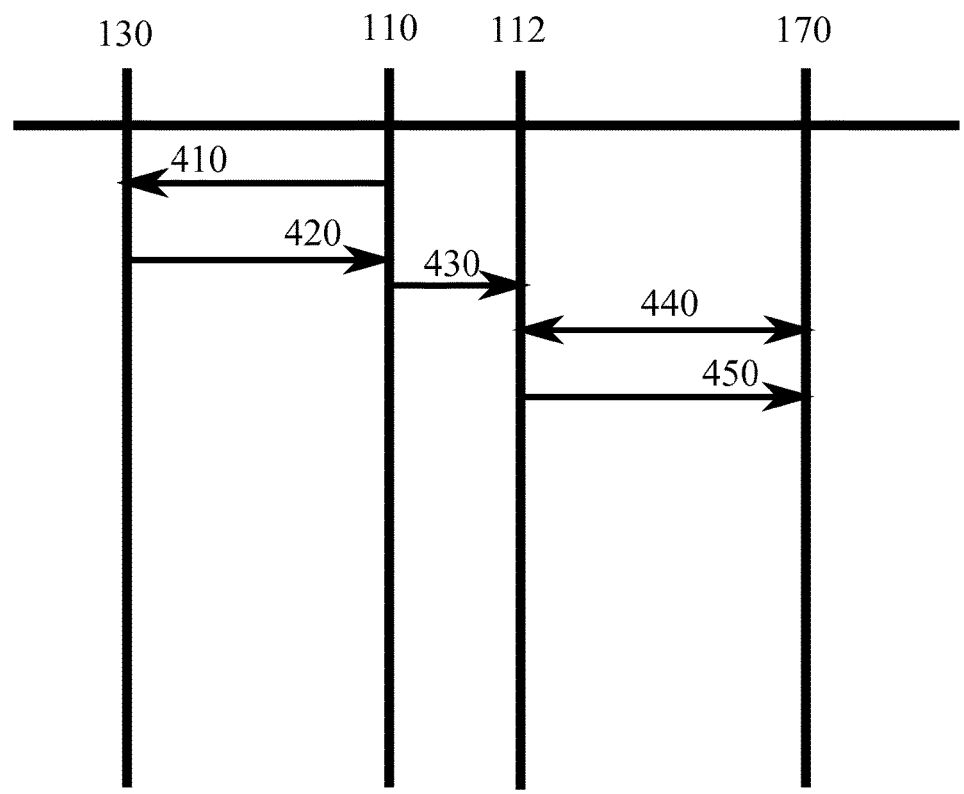
FIG. 4 illustrates signalling in accordance with at least some embodiments of the invention.

FIG. 4 illustrates signalling in accordance with at least some embodiments of the invention. On the vertical axes are, from left to right, network 130, gateway 110, secure element 112 and rendering device 170. Time advances from top to bottom.

In phase 410, gateway 110 may transmit a request for media content, such as for example for a movie, to network 130, for example to a server disposed in network 130. The gateway may include in the message of phase 410 at least one of an identifier of the media content requested, an identifier of gateway 110, an identifier of a subscription, such as for example an authorization token, associated with gateway 110, a public key of a credential stored in secure element 112, an identifier of at least one credential disposed in gateway 110, and a format in which the media content is requested. Phase 410 may comprise more than one message.

Responsive to the message or messages of phase 410, a service disposed in network 130 may determine whether the requested media content is to be provided. Such a decision may be based, for example, at least in part on information relating to a subscription relating to gateway 110, the identifier of the at least one credential disposed in gateway 110, a public key of a public key-private key pair and/or information relating to a subscription relating to the identifier of the at least one credential disposed in gateway 110.

In phase 420, the requested media content may be delivered, for example in encrypted form, to gateway 110. The media content may be encrypted specifically for gateway 110 or a credential therein, for example where the message of phase 410 comprises a public key, the media content may be encrypted with this public key, for decryption in secure element 112, or elsewhere in gateway 110, using the associated private key. Gateway 110 may provide the media content to secure element 112. Secure element 112 may apply at least one credential, which may comprise a private key, for example, to decrypt the media content or grant authorization for application usage.

In optional phase 440 a connection may be initialized between secure element 112 and/or gateway 110 on one hand, and rendering device 170 on the other hand. Processes to initialize such a connection are described above in connection with FIG. 1.

In phase 450, the decrypted media content may be provided from secure element 112, or elsewhere from gateway 110, to rendering device 170. As discussed above, the connection to rendering device 170 may be a secure connection.

Although not separately illustrated in FIG. 4, gateway 110 and secure element 112 may, in some embodiments, receive encrypted content from more than one provider, and use more than one credential to process, for example using a dedicated credential for each provider.

Figure 5:
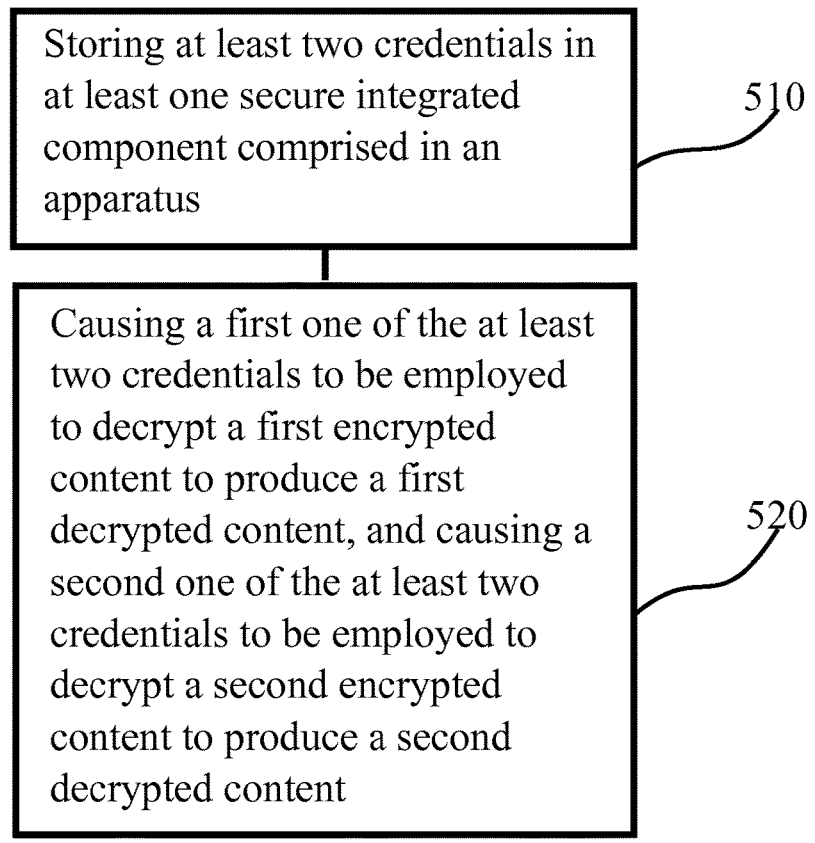
FIG. 5 is a flow graph of a method in accordance with at least some embodiments of the invention.

FIG. 5 is a flow graph of a method in accordance with at least some embodiments of the invention. The phases of the illustrated method may be performed in gateway 110, for example. The phases of the illustrated method may be performed at least in part in secure element 112. Phase 510 comprises storing at least two credentials in at least one secure element comprised in an apparatus. Phase 520 comprises causing a first one of the least two credentials to be employed to decrypt a first encrypted content to produce a first decrypted content, and causing a second one of the at least two credentials to be employed to decrypt a second encrypted content to produce a second decrypted content. The method may further comprise, for example, causing the first decrypted content be provided to a first rendering device over a first secured tunnel connection, wherein an endpoint of the first secured tunnel connection resides in the apparatus.

In general there is provided an apparatus comprising at least one secure element configured to store at least two credentials, and at least one processing core configured to cause a first one of the least two credentials to be employed to decrypt a first encrypted content to produce a first decrypted content, and to cause a second one of the at least two credentials to be employed to decrypt a second encrypted content to produce a second decrypted content. The apparatus may comprise a gateway. The second key may be bound to a particular secondary device or to a group of particular secondary devices, wherein the secondary devices may comprise rendering devices. The apparatus may be configured to cause the first decrypted content be provided to a first rendering device over a first secured tunnel connection, wherein an endpoint of the first secured tunnel connection resides in the apparatus. The apparatus may be configured to provide the second decrypted content to a second rendering device over a second secured tunnel connection, wherein an endpoint of the second secured tunnel connection resides in the apparatus.

In some embodiments, both the endpoint of the first secured tunnel connection and the endpoint of the second secured tunnel connection reside in one of the at least one secure element. In some embodiments, the endpoints are comprised in the same secure element. In some embodiments, the endpoints are comprised in distinct secure elements. In some embodiments, the endpoint of the first secured tunnel connection is comprised in the same secure element as stores the first credential. In some embodiments, the endpoint of the second secured tunnel connection is comprised in the same secure element as stores the second credential.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
   at least one secure integrated component configured to store at least two credentials, each of the at least two credentials comprising a cryptographic key which enables decryption of content, and
   at least one processing core configured to cause a first one of the at least two credentials to be employed to decrypt a first encrypted media stream to produce a first decrypted media stream, to cause a second one of the at least two credentials to be employed to decrypt a second encrypted media stream to produce a second decrypted media stream, and to cause the first decrypted media stream be provided to a first rendering device over a first secured tunnel connection, wherein an endpoint of the first secured tunnel connection resides in the apparatus, and to cause the second decrypted media stream to be provided to a rendering device over a second secured tunnel connection.

2. An apparatus according to claim 1, wherein the at least one processing core is configured to cause the first one of the at least two credentials to be employed to decrypt the first encrypted media stream by providing the first encrypted media stream to at least one of the at least one secure integrated component, and the at least one secure integrated component is configured to output the first decrypted media stream.

3. An apparatus according to claim 1, wherein the at least one secure integrated component is configured to at least one of decode and error control the first decrypted media stream.

4. An apparatus according to claim 1, wherein the apparatus further comprises a memory storing computer program code, the computer program code being configured to cause processing of at least one of the first encrypted media stream, the second encrypted media stream, the first decrypted media stream and the second decrypted media stream.

5. An apparatus according to claim 4, wherein the computer program code is partially but not completely stored in the at least one secure integrated component.

6. An apparatus according to claim 1, wherein at least one of the at least one processing core and the at least one secure element is configured to provide the first decrypted media stream to at most a predetermined number of rendering devices.

7. An apparatus according to claim 6, wherein the predetermined number is one.

8. An apparatus according to claim 1, wherein an endpoint of the second secured tunnel connection resides in the apparatus.

9. An apparatus according to claim 8, wherein at least one of the endpoint of the first secured tunnel connection and the endpoint of the second secured tunnel connection resides in one of the at least one secure integrated component.

10. A method comprising:
storing at least two credentials in at least one secure integrated component comprised in an apparatus each of the at least two credentials comprising a cryptographic key which enables decryption of content;
causing a first one of the least two credentials to be employed to decrypt a first encrypted media stream to produce a first decrypted media stream, and causing a second one of the at least two credentials to be employed to decrypt a second encrypted media stream to produce a second decrypted media stream, and
causing the first decrypted media stream to be provided to a first rendering device over a first secured tunnel connection, wherein an endpoint of the first secured tunnel connection resides in the apparatus and causing the second decrypted media stream to be provided to a rendering device over a second secured tunnel connection.

11. A method according to claim 10, wherein causing the first one of the at least two credentials to be employed to decrypt the first encrypted media stream comprises providing the first encrypted media stream to at least one of the at least one secure integrated component, outputting the first decrypted media stream from the at least one secure integrated component.

12. A method according to claim 10, wherein the at least one secure integrated component is configured to at least one of decode and error control the first decrypted media stream.

13. A method according to claim 10, further comprising storing in the apparatus computer program code, the computer program code being configured to cause processing of at least one of the first encrypted media stream, the second encrypted media stream, the first decrypted media stream and the second decrypted media stream.

14. A method according to claim 13, wherein the computer program code is partially but not completely stored in the at least one secure integrated component.

15. A method according to claim 10, further comprising providing the first decrypted media stream to at most a predetermined number of rendering devices.

16. A non-transitory computer readable medium having stored thereon a set of computer readable instructions that, when executed by at least one processor, cause an apparatus to at least:
store at least two credentials in at least one secure integrated component comprised in an apparatus each of the at least two credentials comprising a cryptographic key which enables decryption of content;
cause a first one of the least two credentials to be employed to decrypt a first encrypted media stream to produce a first decrypted media stream, and cause a second one of the least two credentials to be employed to decrypt a second encrypted media stream to produce a second decrypted media stream, and
cause the first decrypted media stream be provided to a first rendering device over a first secured tunnel connection, wherein an endpoint of the first secured tunnel connection resides in the apparatus and to cause the second decrypted media stream to be provided to a rendering device over a secured tunnel connection.

* * * * *